May 25, 1937.  K. ENGEL  2,081,228
METHOD OF AND MACHINE FOR USE IN MANUFACTURING SHOES
Filed Jan. 29, 1936  5 Sheets-Sheet 3

INVENTOR
Karl Engel
By his Attorney
Harlow M. Davis

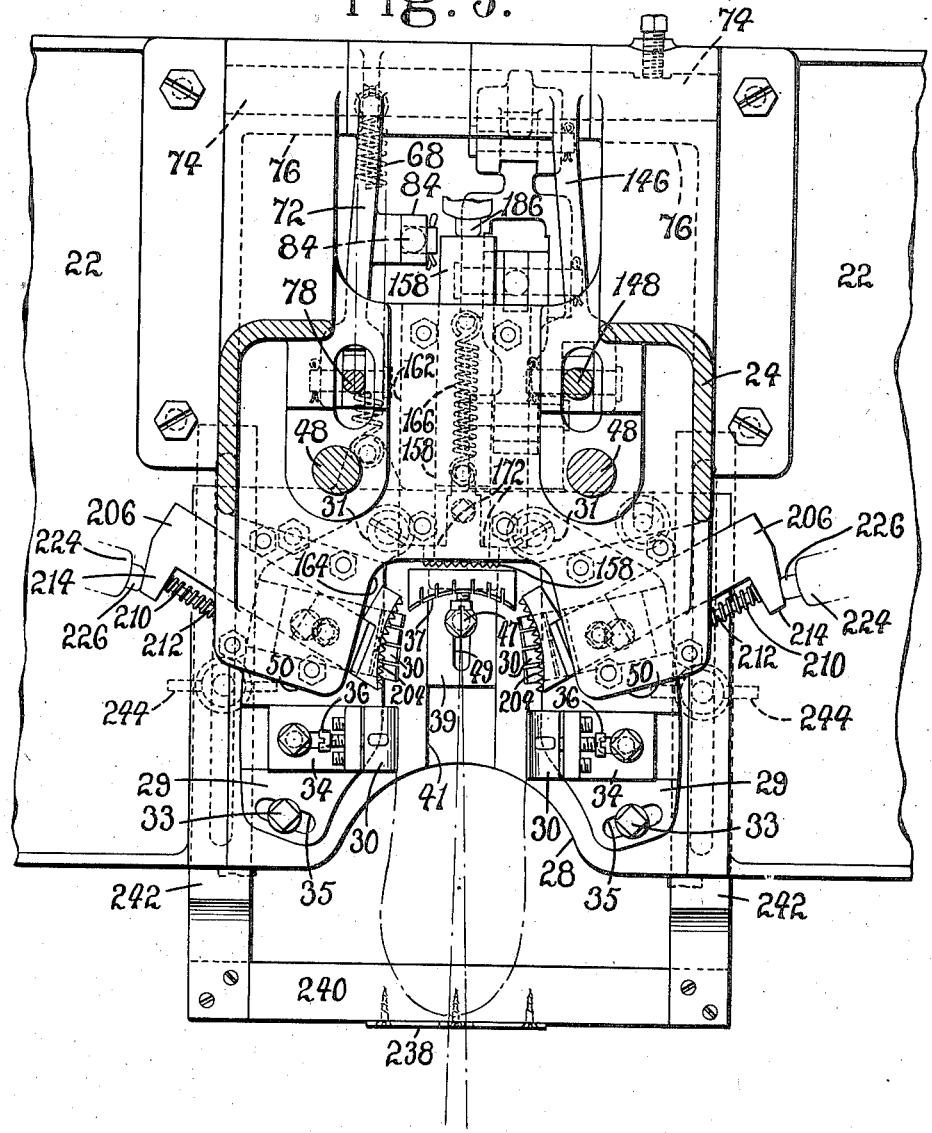

May 25, 1937.  K. ENGEL  2,081,228
METHOD OF AND MACHINE FOR USE IN MANUFACTURING SHOES
Filed Jan. 29, 1936  5 Sheets-Sheet 5
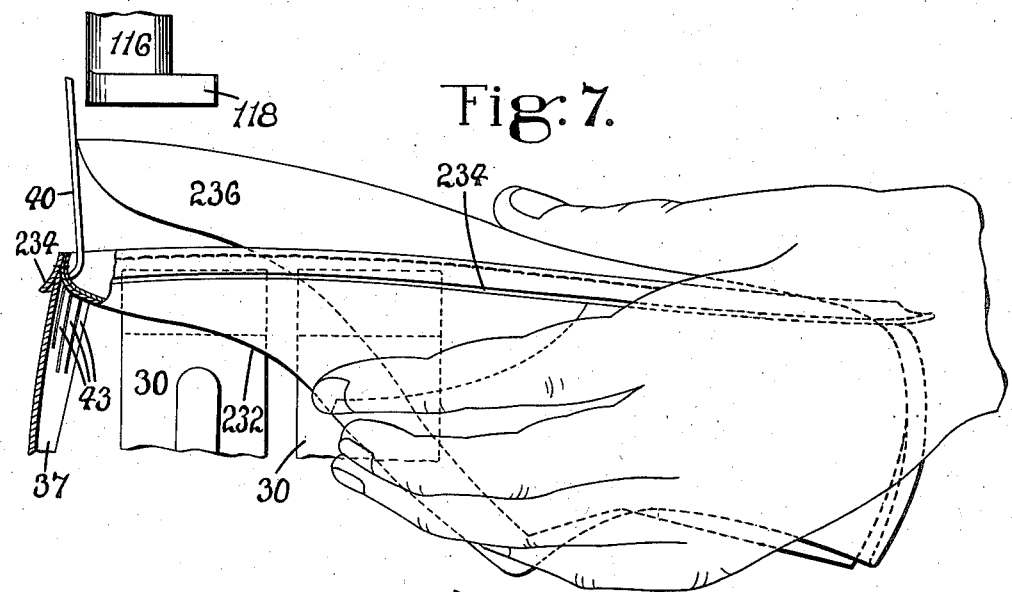
Fig. 7.
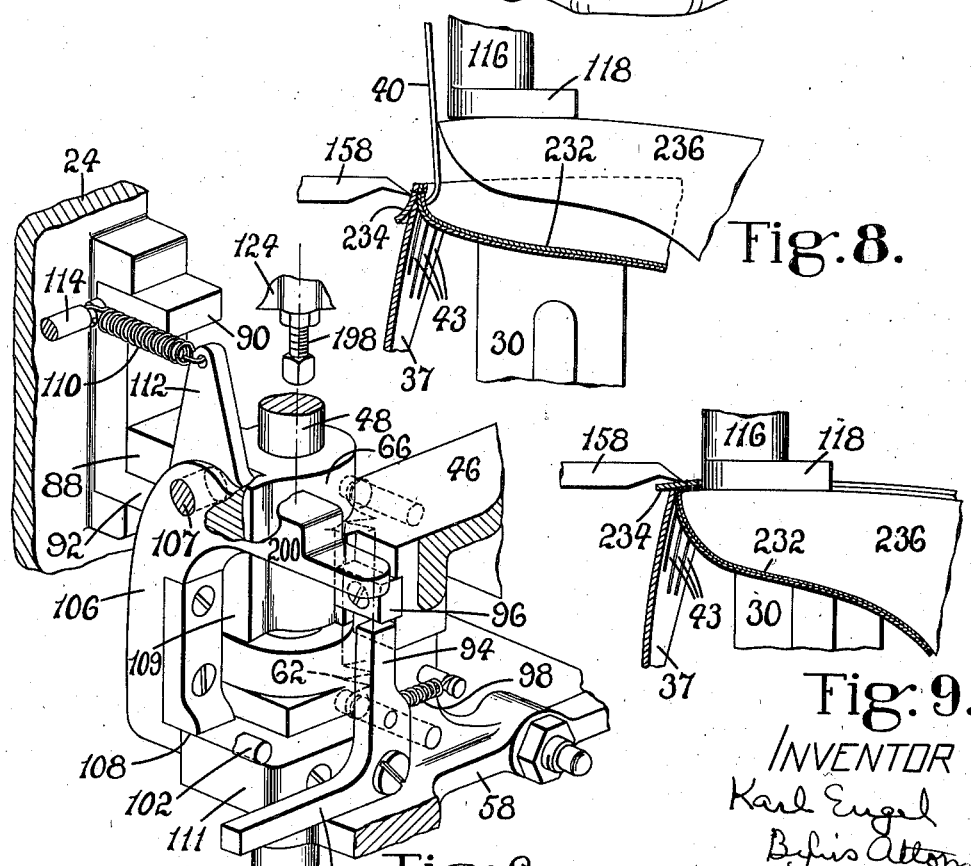
Fig. 8.
Fig. 6.
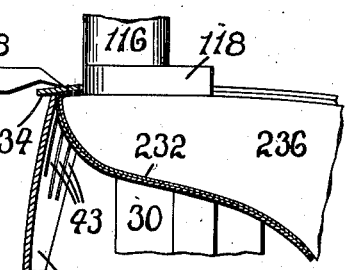
Fig. 9.
INVENTOR
Karl Engel
By his Attorney
Harlow M. Davis Patented May 25, 1937

2,081,228

UNITED STATES PATENT OFFICE 2,081,228

METHOD OF AND MACHINE FOR USE IN MANUFACTURING SHOES

Karl Engel, Swampscott, Mass., assignor to United Shoe Machinery Corporation, Paterson, N. J., a corporation of New Jersey Application January 29, 1936, Serial No. 61,353

42 Claims. (Cl. 12—7)

The present invention relates to methods of and machines for use in manufacturing boots and shoes and is herein illustrated in its application to the manufacture of prewelted shoes, that is, shoes in the manufacture of which a welt is stitched to the upper before the upper is lasted.

In the manufacture of such shoes it is usual to assemble the upper on a last and pull the welted margin of its forepart over the last by means of hand pincers and to secure the welted margin in pulled-over position by means of tacks driven through the welted margin and into the margin of the last bottom.

It is an object of the present invention to provide a machine for performing the work which is now performed by means of hand pincers in the pulling-over of pre-welted shoes. With this object in view the invention contemplates the provision in a machine for use in the manufacture of prewelted shoes of upper-supporting and positioning members constructed and arranged to engage, respectively, the interior of the welted margin of a pre-welted upper, the exterior of the upper within the welt crease, and the sole-attaching face of the welt. In the illustrated machine the work-supporting and positioning members comprise a series of upstanding work-supporting members or plates constructed and arranged to engage the exterior of a pre-welted upper within the welt crease, a series of spreader members or resilient plates constructed and arranged to engage the interior of the welted margin of the upper, and a series of upper-gripping plates constructed and arranged to engage the sole-attaching face of the welt. In the illustrated machine the positioning means operate on the forepart only of a pre-welted upper, the rear part of the upper and its last being manually supported.

For pressing the forepart of a last into the forepart of the supported upper the illustrated machine is provided with a depressor which, according to a feature of the invention, is operated in a fixed time relation to the operation of the welt-engaging plates.

The invention includes an improvement in methods of making pre-welted shoes which comprises securing to the overlasting margin of an upper which is in temper a welt which is not in temper and which, as illustrated in the drawings, is substantially shorter than the periphery of the bottom of a last corresponding in size to the upper, pulling the upper over such a last and retaining the upper in pulled-over position on the last solely by the tension of the welt. By tempering the upper before operating thereon the stretching of the upper incidental to the pulling-over operation is greatly facilitated, while the employment of a welt which is not in temper prevents stretching of the welt during the pulling-over operation to such an extent that it could not operate to retain the upper in pulled-over position on the last. Similarly, a welt which is not in temper has greater tensile strength than a tempered welt and is therefore better suited to retain the upper in pulled-over position on the last.

These and other aspects and features of the invention will now be described with reference to the accompanying drawings and will be pointed out in the appended claims.

In the drawings,

Fig. 5 is a sectional plan view taken substantially on the line V—V of Fig. 1;

Fig. 6 is a perspective view illustrating certain operating parts of the machine;

Fig. 7 is a side elevation of a pre-welted upper and a last mounted on work-supporting members of the machine and awaiting the operation of the last depressor, the lower end of which is illustrated;

Fig. 8 is a view similar to Fig. 7 showing the toe end of a last and the toe end of an upper in section with the last depressor in engagement with the toe portion of the last bottom and a fragment of one of the gripper plates in engagement with the welt; and Fig. 9 is a view similar to Fig. 8 showing the last fully depressed into the upper and the welted margin of the upper bent over the edge of the last bottom by the gripper plate.

Figure 1:
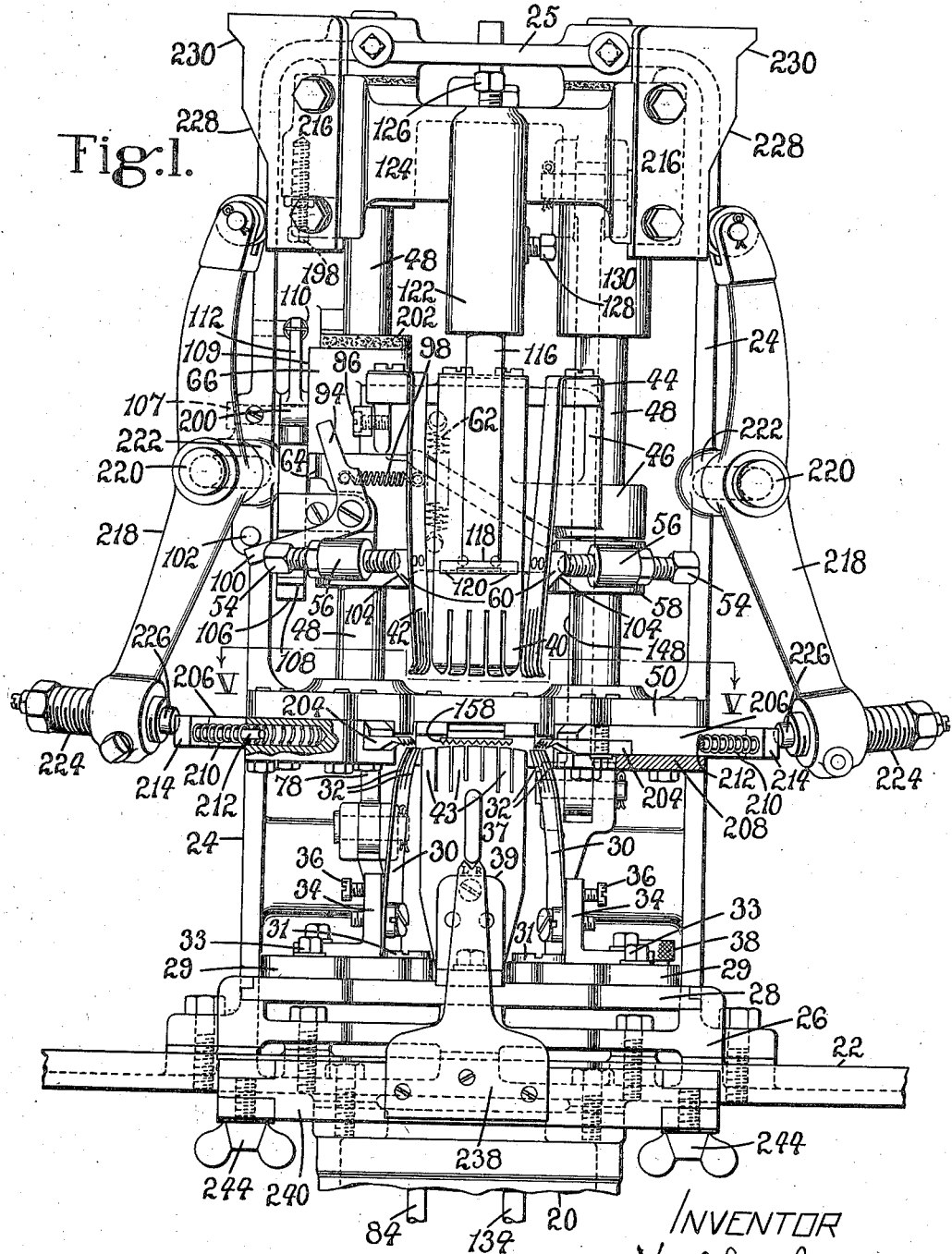
Fig. 1 is a front elevation of the head of a machine embodying the features of the present invention.
Figure 2:
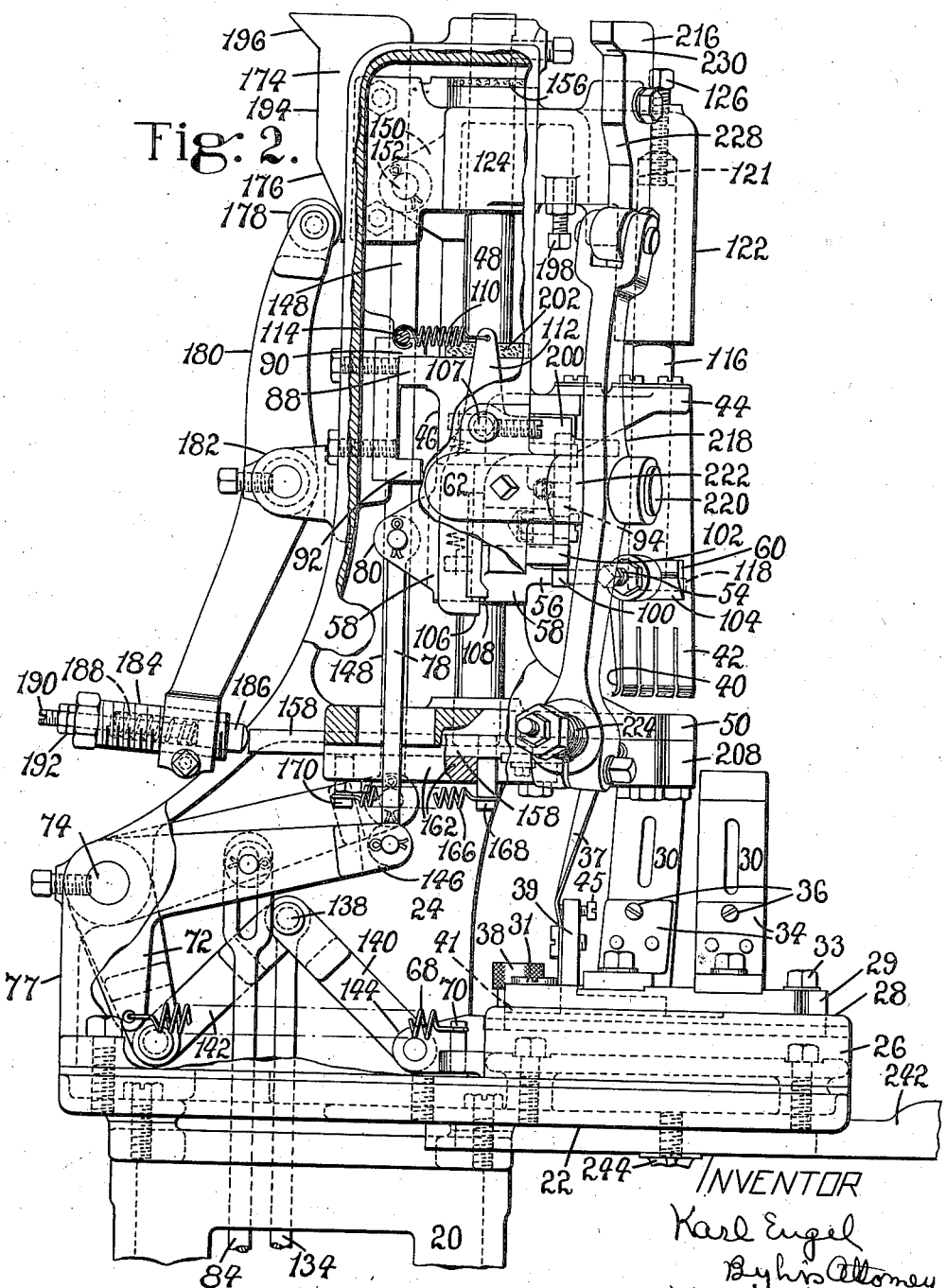
Fig. 2 is a side elevation of the machine head illustrated in Fig. 1, part of the frame being broken away to show certain of the operating parts of the machine.
Figure 4:
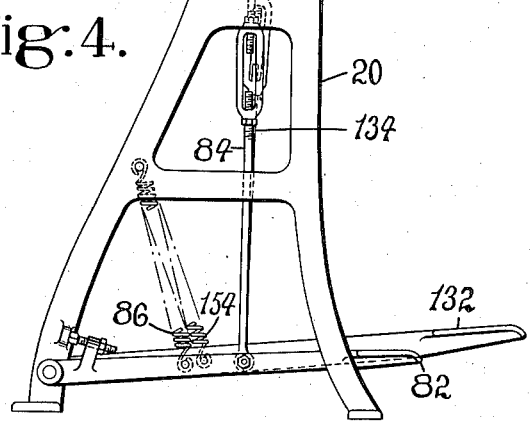
Fig. 4 is a side elevation of the base of the machine.

Referring to Fig. 4, the base or frame is indicated at 20. To the top of the frame there is secured a table 22 (Fig. 1) and on the table there is secured the upstanding frame 24 of the machine head. The frame 24 comprises parallel vertical side portions connected at their upper ends by a head 25 and connected at intermediate points by a crosshead 50 which, as illustrated in Fig. 2, projects forwardly from the sides of the frame. Secured to the forward portion of the table 22 centrally of the width of the frame 24 is a bed plate 26 which provides a guideway for a slide 28 movable from front to back of the machine. The slide 28 carries a pair of base members or plates 29 each of which carries a pair of upstanding work-supporting plates 30 which terminate at their upper extremities in a plurality of fingers 32, the upper ends of which are bent slightly, as illustrated in Fig. 1, to facilitate their engagement within the welt crease of an upper mounted thereon. The plates 30 are secured to the base plates 29 by angular brackets 34 secured to the base plates. For causing the plates 30 to incline inwardly toward each other the brackets 34 each carry at their upper ends an abutment screw 36 the end of which engages the plate 30 and by its adjustment determines the angular position of the plate. The work-supporting plates 30 are adjusted toward or from each other to accommodate different sizes of shoes by swinging the base plates 29 toward or from each other about their pivot screws 31 (Fig. 5), said base plates each being secured in its adjusted position by a headed screw 33 extending through a slot 35 in the forward portion of the plate 29 and into a tapped hole in the slide 28. For supporting the toe end of a pre-welted upper a plate 37 (Fig. 2) is secured to the upstanding portion of an angular bracket 39 which is slidably mounted in a groove 41 (Fig. 5) extending from front to back of the slide 28 between the base plates 29 and secured in the position to which it is adjusted by a clamping screw 47 extending through a slot 49 in the bracket and into a tapped hole in the slide 28. The plate 37 terminates at its upper extremity in a plurality of fingers 43 (Fig. 7) similar to the fingers 32 of the plates 30. The plate 37, as illustrated in Fig. 2, inclines forwardly, the extent of such inclination being determined by the adjustment of an abutment screw 45 in the bracket 39 corresponding to the abutment screws 36 in the brackets 34. For securing the slide 28 to the bed plate 26 a thumb screw 38 (Fig. 1) is threaded to the bed plate 26 and positioned in an open-ended slot (not shown) in the slide 28, the head of said screw being brought into clamping engagement with the top of the slide to secure the slide to the bed plate.

For spreading the forepart of a supported upper for the reception of a last a series of resilient plates, herein illustrated as a toe plate 40 and two side plates 42 (Fig. 1), are secured to the top of a bracket 44 extending forwardly from a crosshead or slide 46, said plates extending downwardly from the bracket. The crosshead 46 is slidably mounted on parallel vertical shafts 48 extending between the head 25 of the frame 24 and the crosshead 50 connecting the side portions of the frame. In order to increase the flexibility of the plates 40 and 42, their lower end portions are divided into a series of downwardly extending fingers, each of which has its end portion bent to position its lower edge face or tip for engagement with the interior of a supported upper (Fig. 7).

Figure 3:
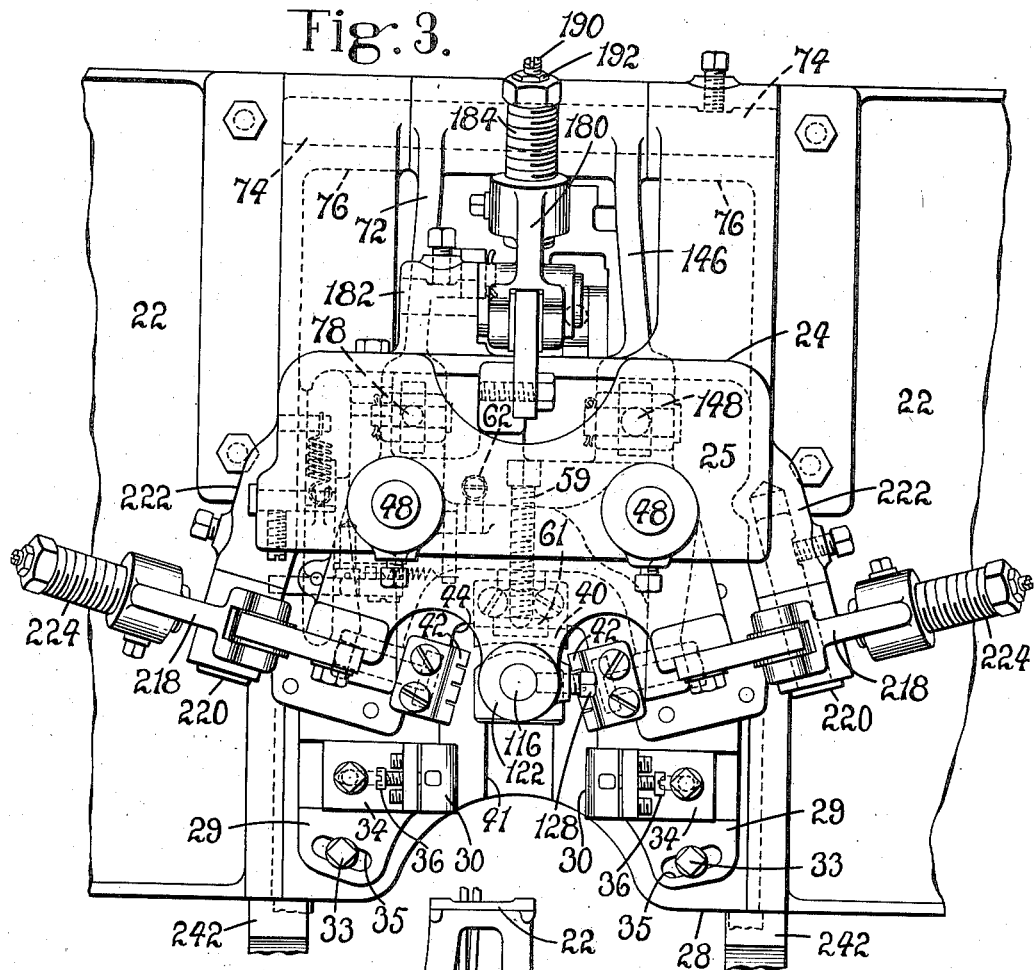
Fig. 3 is a plan view of the machine.

The upper-spreading assembly comprising the plates 40 and 42 is contracted to facilitate its entrance into the interior of the forepart of a supported upper by bending the toe plate 40 forwardly and by bending the side plates 42 toward each other, said plates being held in their bent position, as illustrated in Fig. 1, throughout the entire extent of their downward movement. For bending the side plates 42 into their position illustrated in Fig. 1 and holding them so positioned during their downward movement, a pair of screws 54 are mounted in arms 56 extending forwardly from opposite sides of a crosshead or slide 58. The screws 54 engage bosses 60 projecting outwardly from the plates 42. For bending the toe plate 40 into its position illustrated in Fig. 2 an abutment screw 59 (Fig. 3) projects forwardly from the center of the crosshead 58 for engagement with a boss 61 on the toe plate 40 corresponding to the bosses 60 on the plates 42. The crosshead 58 is slidably mounted on the vertical shafts 48 beneath the crosshead 46. Said crossheads are yieldingly held together by a tension spring 62 which connects the rear portions of said crossheads and positions them as illustrated in Fig. 1, in which position the top of a boss 64 projecting upwardly from the crosshead 58 at its left side, as seen in Fig. 1, engages the bottom of a boss 66 projecting upwardly from the crosshead 46. Each of said bosses is drilled to slide on one of the shafts 48, and has sufficient bearing on said shaft to prevent angular misplacement or binding of the crossheads thereon. The spring 62 holds the crossheads 46 and 58 together during the downward movement of the upper-spreading plates and thus maintains engagement of the screws 54 with the bosses 60 thereby maintaining the contracted position of the upper-spreading assembly illustrated in Fig. 1 while it moves downwardly into a supported upper. The upper-spreading assembly is normally held at the limit of its upward movement, as seen in Fig. 1, by a tension spring 68 (Fig. 2) one end of which is attached to a pin 70 projecting upwardly from the table 22 and the opposite end of which engages the downwardly extending arm of a bell crank lever 72 pivotally mounted on a cross shaft 74 (Fig. 3) extending between bosses 76 projecting inwardly from opposite sides of the rearwardly extending base portion 77 (Fig. 2) of the frame 24. The horizontal arm of the bell crank lever 72 is connected by a link 78 to ears 80 projecting rearwardly from the back of the crosshead 58. For imparting downward movement to the crosshead 58 a treadle 82 (Fig. 4) is connected to the horizontal arm of the bell crank lever 72 by a link 84, said link having a pin and slot connection with the bell crank lever in order to permit the treadle 84 to be returned to its elevated position by the treadle spring 86 while the crosshead 58 remains at the limit of its downward movement. The spring 68 holds the crossheads 46 and 58 in their respective positions illustrated in Fig. 2, such positions being determined by the engagement of a projection 88 on the crosshead 46 with a stop 90 projecting forwardly from the back of the frame 24. The upper-spreading position of the plates 40 and 42 is determined by the engagement of the projection 88 with a stop 92 projecting forwardly from the back of the frame 24 a predetermined distance below the stop 90. The projection 88 engages the stop 92 at an intermediate stage in the downward movement of the crosshead 58 by the treadle 82 and further downward movement of the crosshead 58 after the crosshead 46 comes to the limit of its downward movement causes the screws 54 to move out of engagement with the bosses 60 on the upper-spreading plates, thus permitting said plates to spring outwardly into engagement with the interior of the welted margin of a supported upper.

The upper-spreading assembly remains in its expanded position during its upward movement after the depression of a last into a supported upper, thus preventing any movement of the ends of the plates 40 and 42 inwardly over the last bottom with consequent injury to the last. In order to maintain the desired expanded position of the upper-spreading assembly a spacer member 94 (Fig. 6) is pivoted to the lower crosshead 58 and arranged to extend upwardly therefrom for engagement with a block 96 secured to the upper crosshead 46 thereby to hold the crossheads apart from each other during the upward movement of the spreader assembly. The spacer member is swung into its operative position during the downward movement of the crosshead 58 by a tension spring 98, one end of which is attached to the spacer member and the other end of which engages a pin on the crosshead 58. The spacer member is swung into operative position during that portion of the downward movement of the crosshead 58 which occurs after the crosshead 46 comes to rest and remains in operative position during the upward movement of the spreader plates 40 and 42 until they have disengaged the work, at which time a tail 100 formed integrally with the spacer 94 and arranged to extend perpendicularly therefrom engages a pin 102 projecting forwardly from the frame 24. Further upward movement of the crosshead 58 thereafter causes the spacer member to swing in a counterclockwise direction thereby disengaging the spacer member from the block 96 and permitting the spring 62 to draw the crossheads 46 and 58 together. As the crossheads are drawn together the screws 54 carried by the crosshead 58 slide upwardly along cam faces 104 (Fig. 1) provided in the bosses 60 on the plates 40 and 42 and return said plates to their initial position, as seen in Fig. 1.

For holding the upper-spreading assembly at the limit of its downward movement a latch 106 (Fig. 6) is pivotally mounted on a pin 107 projecting horizontally from the inner surface of the left side wall of the frame 24 and is confined between said wall and the flat face 109 of the boss 66 on the crosshead 46. The latch 106 is provided near its lower end with a shoulder 108 arranged to engage the top face of a block 111 secured to the crosshead 58 and to hold said crosshead at the limit of its downward movement. The latch is swung into operative position by a tension spring 110 one end of which engages the end of an upwardly extending tail 112 of the latch member and the other end of which engages a pin 114 projecting inwardly from the side wall of the frame 24.

After positioning the forepart of a pre-welted upper on the supporting plates 36 and 37 and positioning the spreader plates 40 and 42 against the interior of the welted margin of the supported upper, the heel end of a last is positioned within the heel end of the supported upper and the forepart of the last is swung downwardly into engagement with the spreader plate 40. The heel portions of the last and upper are manually supported throughout the operation of the machine. The forepart of the last is forced downwardly into the forepart of the supported upper by a depressor member herein illustrated as a vertical member or rod 116 (Figs. 1, 2, and 7) having secured to its bottom end face a presser member or plate 118 having feet 120 (Fig. 1) formed in the opposite sides thereof and arranged to engage the bottom face of the last at opposite sides of its longitudinal median line. The rod 116 is mounted in a vertical bore 121 (Fig. 2) in a boss 122 projecting downwardly from the forward extremity of a crosshead 124, said rod being seated against the end of a screw 126 extending downwardly through the top of the crosshead 124 and into the bore 121, said screw being adjustable in order to vary the heightwise position of the presser member 118. The rod 116 is secured to the boss 122 by a set screw 128 (Fig. 1). The crosshead 124 is slidably mounted on the vertical shafts 48 above the crosshead 46 and is provided with a boss 130 (Fig. 1) which extends downwardly from the right side of the crosshead and provides a long bearing on the vertical shaft. For imparting downward movement to the crosshead 124 a treadle 132 (Fig. 4) is pivotally mounted at one end thereof to the lower portion of the base 20 and a link 134 is pivoted to the treadle substantially midway between its ends and arranged to extend upwardly therefrom through an opening in the table 22. The upper end of the link 134 carries a pin 138 (Fig. 2) which provides a pivotal connection for a pair of toggle links 140 and 142. The end of the link 140 opposite the pin 138 is pivotally mounted between ears 144 projecting rearwardly from the bed plate 26 while the corresponding end of the link 142 is pivoted to the end of the vertical arm of a bell crank lever 146 which is journaled on the cross shaft 74 adjacent to the bell crank lever 72 (Fig. 5). For transmitting the upward movement of the horizontal arm of the bell crank lever 146 to the crosshead 124 a link 148 (Fig. 2) is pivoted at its lower end to the end of the horizontal arm of the bell crank lever while its upper end is positioned between a pair of ears 150 projecting rearwardly from the crosshead 124 and pivoted on a cross pin 152 extending between said ears. The crosshead 124 is held at the limit of its upward movement, as seen in Fig. 1, by a treadle spring 154 (Fig. 4), one end of which is connected to the treadle 132 and the other end of which is connected to the base 20.

In order to grip the welted margin of the toe end of a supported upper and to hold the upper in position on its supporting plates during the depression of the forepart of a last into the forepart of the upper, a gripper member, herein illustrated as a horizontal plate 158 (Figs. 1, 5 and 8), is slidably mounted in a groove in the top of a plate 162 (Fig. 2) secured to the bottom of the crosshead 50, said groove extending from front to back of the crosshead. Corresponding side gripper plates 204, the construction and operation of which are hereinafter described, are arranged to grip opposite sides of the toe portion of the welted margin of a supported upper. The central portion of the crosshead 50 is provided with a recess 164 (Fig. 5), the wall of said recess defining generally the position of the forepart of a supported upper in the machine and providing the necessary clearance for the movements of a last in the machine. The plate 158 is arranged centrally of said recess widthwise of the machine and in its normal position, as illustrated in Fig. 5, is arranged with its gripping edge projecting slightly beyond the wall of the recess 164, in which position the plate is yieldingly held by a tension spring 166 (Fig. 2), the forward end of which engages a pin 168 projecting downwardly from the forward portion of the plate 158 while the opposite end of said spring engages a pin 170 projecting downwardly from the rear portion of the plate 162. The retracted position of the plate 158 is determined by the engagement of shoulders 172 (Fig. 5) in the plate 158 with suitable abutment faces in the forward portion of the plate 162. For advancing the plate 162 as the depressor begins its downward movement a cam plate 174 (Fig. 2) is secured to the rear portion of the crosshead 124, the portion of the rear edge face of the plate 174 near its bottom extending rearwardly and upwardly to provide a cam face 176. During the downward movement of the crosshead 124 said cam face engages a roll 178 at the upper end of a vertical lever 180 pivotally mounted midway between its ends on a boss 182 projecting rearwardly from the frame 24. In the lower end of the lever 180 an internally threaded split clamp is formed for the reception of an externally threaded barrel 184 within which there is slidably mounted a plunger 186 the head of which engages the rear end of the plate 158 and transmits thereto the swinging movement imparted to the lever 180 by the downward movement of the crosshead 124. The plunger 186 is backed up by a compression spring 188 which is coiled about a stem 190 formed integrally with the plunger 186, the spring being confined between the head of the plunger and the base of a spring-receiving counterbore in the barrel 184. The rear portion of the stem 190 extends through a central hole in the rear portion of the barrel 184 and has its projecting end threaded for the reception of stop nuts 192. The movement imparted to the plate 158 by the cam face 176 during the first stage of the downward movement of the crosshead 124 brings the toothed edge of the plate 158 into gripping engagement with the sole-attaching face of the welt of a supported upper (Fig. 8), the plate 158 being held in said position during the continued downward movement of the last-depressing member by the engagement of the roll 178 on the lever 180 with a vertical face 194 in the cam plate 174. After the last has been completely depressed into the upper and the last bottom has been positioned slightly below the plane of the plate 158 the roll 178 is engaged by a cam face 196 on the plate 174 extending rearwardly and upwardly from the vertical face 194, thus imparting further movement to the lever 180 and through the lever to the plate 158, thereby bending the welted margin of the supported upper over the edge of the toe end of the last bottom. During the downward movement of the last the toe end of the last engages the front face of the plate 49 of the upper-spreading assembly, thus holding said plate from forward movement and enabling it to operate as an abutment against which the plate 158 may clamp the welted margin of the supported upper in order to hold it against downward movement while the last is pressed into it.

Before the final advancement of the plate 158 to bend the welted margin of the supported upper over the edge of the toe end of the last bottom the upper-spreading plates must, of course, be withdrawn from the supported shoe. In the illustrated machine such withdrawal of the upper-spreading plates is effected by disengaging the latch 106 (Fig. 6) from the block 111 on the crosshead 58 just before the cam face 196 in the plate 174 engages the cam roll 178. As herein illustrated, the latch member 106 is swung from its operative position by the engagement of the head of a screw 198 projecting downwardly from the bottom of the crosshead 124 with a horizontal arm 200 projecting forwardly from the latch member 106 substantially in the plane of its axis. As the upper-spreading plates are withdrawn from the supported upper the upper end of the spacer member 94 engages the block 96 on the crosshead 46 and holds the crossheads 46 and 58 apart from each other. During the upward movement of the crosshead 124 after the completion of the operation the spacer member 94 is disengaged from the block 96 whereupon the spring 62 brings the crosshead 58 into engagement with the crosshead 46 and brings the abutment screws 54 into engagement with the bosses on the plates 40, thus returning said plates to their contracted position as illustrated in Fig. 1.

Referring now to the construction and operation of the side gripper plates 204 (Fig. 5), said plates are arranged at opposite sides of a supported pre-welted upper and are provided with toothed edges arranged to engage the outsole-attaching face of the welt. The gripper plates 204 are secured to carrier plates 206 which are slidably mounted in grooves provided in plates 208 (Fig. 1) secured to the under surface of the crosshead 50. The side grippers are yieldingly held in retracted position, as illustrated in Fig. 5, by compression springs 210 coiled about pins 212 mounted in lugs 214 projecting forwardly from the outer ends of the carrier plates 206. Each of said pins extends lengthwise of its carrier plate toward its inner end and into a bore in the plate 208, the spring 210 being seated at the base of said bore. For advancing the gripper plates 204, the crosshead 124 has secured at opposite sides of its front face cam plates 216 (Fig. 1) corresponding generally to the cam plate 174 which operates the gripper plate 158. The cam plates 216 operate levers 218 corresponding to the lever 180 which operates the gripper plate 158, said levers being journaled on headed studs 220 projecting divergently forwardly from bosses 222 at opposite sides of the frame 24. Similarly to the lever 174 each of the levers 218 has a split clamp formed at its lower end which is internally threaded for the reception of an externally threaded barrel 224 which carries a spring-pressed plunger 226, the barrel 224 and the plunger mounted therein being constructed the same as the barrel 184 and its plunger 186. Referring now to Fig. 2, it will be seen that the lower cam face 228 on each of the forward cam plates 216 is positioned somewhat higher than the corresponding cam face on the plate 174, thus permitting the last to move downwardly through the greater part of its stroke before the side gripper plates have come into gripping engagement with the sole-attaching face of the welt. The engagement of the side gripper plates 204 with the welt of the supported upper in the illustrated last occurs before the depression of the last into the upper begins to stretch the upper widthwise thereof but is delayed as long as possible in order to avoid any unnecessary restriction on the depression of the last into the supported upper. The final movement of the side gripper plates 204 to bend the welted margin at opposite sides of the forepart of the supported upper over the edge of the last bottom occurs substantially simultaneously with the corresponding movement of the toe-gripper plate 158, the upper cam faces 230 of the cam plates 216 being arranged at substantially the same elevation as the upper cam face 196 of the cam plate 174 (Fig. 2).

For centering the heel portion of the upper widthwise of the machine an upstanding gage plate 238 is secured to the crossbar of a U-shaped slide 240 (Figs. 1 and 5) the parallel arms 242 of which extend from front to back of the machine in grooves in the bottom of the table 22, thus permitting adjustment of the gage plate for different sizes of shoes. For clamping the slide to the table, thumb screws 244 extend upwardly through slots in the arms 242 and into the table. At its upper extremity the gage plate 238 is provided with two points for indicating the position of back seams of left and right shoes, respectively.

In the manufacture of pre-welted shoes in accordance with the present invention an upper 232 (Fig. 7) which has been mulled or otherwise tempered has an untempered welt 234 stitched to its overlasting margin, said welt being preferably leather or a material of similar tensile strength and resiliency. In stitching the welt to the upper it is essential that the toe portion of the upper be gathered in order to decrease the length of its overlasting margin sufficiently to make it somewhat shorter than the periphery of the bottom of a last, corresponding in size to the upper, thus to enable the upper to be held on the last by the tension of the welt, which, of course, will also be somewhat shorter than the periphery of the last bottom. The gathering of the toe portion of the upper also serves to preform that portion of the upper, thus facilitating the positioning of a last in the upper.

The pre-welted upper thus provided is supported in the illustrated machine by positioning its forepart on the work-supporting plates 30 and 37, the fingers 32 and 43 of the plates 30 and 37, respectively, engaging the upper within the welt crease as illustrated in Fig. 7. The operator then depresses the treadle 82, thus bringing the upper-spreading plates 40 and 42 into engagement with the interior of the welted margin of the toe portion of the upper as illustrated in Fig. 7. The plates 40 and 42 are held from return movement by the latch 106 (Fig. 6) as hereinbefore described. The operator then positions the heel portion of a last 236 in the heel portion of the upper, the toe portion of the last coming to rest against the plate 40. The operator then releases the treadle 82 and depresses the treadle 132 which operates the last-depressing member 116 and the plates 158 and 204. During the first stage of the depression of the treadle 132 the plates engage the sole-attaching face of the welt 234 in the region of the welt seam thereby gripping the welted margin of the upper between the toothed edges of the plates 158 and 204 and the spreader plates 40 and 42 (Fig. 8). During the next stage of the depression of the treadle 132 the cam levers which operate the plates 158 and 204 rest and the forepart of the last 236 moves downwardly into the forepart of the supported upper. As the last nears the limit of its depression into the upper the screw 198 (Fig. 6) on the cross-head 124 engages the arm 200 of the latch 106, disengaging said latch from the crosshead 58 and permitting the upper-spreading plates 40 and 42 to be raised out of the supported upper by the spring 68 (Fig. 2). During the final stage of the depression of the treadle 132 the depression of the last into the upper is completed and the plates 158 and 204 advance again to bend the welted margin of the upper over the edge of the last bottom and into the position illustrated in Fig. 9. The operator then releases the treadle 132, thus permitting return of the depressor 116 and the plates 158 and 204 to their respective initial positions, whereupon the last 236 with the upper mounted thereon is removed from the machine, the upper being held on the last by the tension of the welt 234, which, as above stated, is somewhat shorter than the periphery of the last bottom.

While the invention has been illustrated as embodied in a machine for pulling pre-welted uppers over lasts, it is to be understood that the invention is not so limited but in certain of its aspects is applicable generally to machines for shaping uppers over lasts.

Having thus described my invention, what I claim as new and desire to secure by Letters Patent of the United States is:

1. In a machine for use in the manufacture of pre-welted shoes, upper-supporting and positioning members constructed and arranged to engage, respectively, the interior of the welted margin of a pre-welted upper, the exterior of the upper within the welt crease, and the sole-attaching face of the welt.

2. In a machine for use in the manufacture of pre-welted shoes, means for positioning a pre-welted upper for the reception of a last comprising upper-supporting members constructed and arranged to engage the upper-engaging surface of the welt, means constructed and arranged to engage the interior of the welted margin of the upper and to press it outwardly against said member, and a series of members constructed and arranged to engage the sole-attaching face of the welt.

3. In a machine for use in the manufacture of pre-welted shoes, supports extending heightwise of a supported upper and arranged to engage the upper within the welt crease, and clamping members constructed and arranged to engage the interior of the welted margin of the upper, said supporting members and clamping members being relatively movable heightwise of the shoe to locate the clamping members in operative position.

4. In a machine for use in the manufacture of pre-welted shoes, supports extending heightwise of a supported upper and arranged to engage the upper within the welt crease, clamping members constructed and arranged to engage the interior of the welted margin of the upper, said supporting members and clamping members being relatively movable heightwise of the shoe to locate the clamping members in operative position, and clamping members movable in a plane generally common to the welted margin of the upper to engage the sole-attaching face of the welt.

5. In a machine for use in the manufacture of pre-welted shoes, means for holding a pre-welted upper for the reception of a last comprising fixed upper-supporting plates, and a series of clamping plates constructed and arranged to engage the interior of the welted margin of the supported upper, said plates being movable heightwise of the upper to position them within the upper and then outwardly of the upper to bring them into clamping engagement with the welted margin thereof.

6. In a machine for use in the manufacture of pre-welted shoes, means for holding a pre-welted upper for the reception of a last comprising fixed upper-supporting plates arranged to extend generally heightwise of a supported upper, a series of clamping plates constructed and arranged to engage the interior of the welted margin of the upper, said plates being movable heightwise of the upper to position them within the upper and then outwardly of the upper to bring them into clamping engagement with the welted margin thereof, a series of plates arranged for movement in a plane generally common to the welted margin of the upper into engagement with the sole-attaching face of the welt, means for pressing a last into the supported upper, and means for further advancing said welt-engaging plates after the depression of the last into the upper thereby to bend the welted margin of the upper over the edge of the last bottom.

7. In a machine for use in the manufacture of pre-welted shoes, means for supporting a pre-welted upper constructed and arranged to engage the upper-engaging face of the welt, a series of clamping members constructed and arranged to engage the interior of the welted margin of the upper and to press it outwardly against said supports, a series of lasting plates, means for depressing a last into the supported upper, and cam-actuated means for first bringing said plates into gripping engagement with the upper, then holding the plates in gripping engagement with the upper during the depression of the last into the upper, and finally laying the welted margin of the upper over the margin of the last bottom.

8. In a machine for use in the manufacture of pre-welted shoes, upper-supporting members extending generally heightwise of an upper in the machine and constructed and arranged to engage the upper-engaging face of the forepart of the welt of a pre-welted upper while the rear part of the upper is manually supported, means for clamping the margin of the upper outwardly against said supports, and means for depressing the forepart of a last into the forepart of the upper.

9. In a machine for use in the manufacture of pre-welted shoes, upper-supporting plates extending generally heightwise of an upper in the machine and constructed and arranged to engage the upper-attaching face of the welt and the adjacent portion of the upper about its forepart while the rear part of the upper is manually supported, clamping plates extending generally heightwise of the upper into the interior of its forepart and arranged to clamp the welted margin of the upper against said upper-supporting plates, and a depressor for forcing the forepart of a last into the forepart of the upper.

10. In a machine for use in the manufacture of pre-welted shoes, upper-supporting plates extending generally heightwise of an upper in the machine and constructed and arranged to engage the upper-attaching face of the welt and the adjacent portion of the upper about its forepart while the rear part of the upper is manually supported, and clamping plates extending generally heightwise of the upper into the interior of its forepart, said clamping plates being constructed and arranged to be engaged and moved outwardly of the supported upper into engagement with the interior of its welted margin by the movement of the forepart of a last into the forepart of the upper.

11. In a machine for use in the manufacture of pre-welted shoes, upper-supporting members constructed and arranged to engage the upper-engaging face of the forepart of the welt of a pre-welted upper while the rear part of the upper is manually supported, a series of clamping plates movable heightwise of the supported upper into the interior of the upper and movable outwardly of the upper into clamping engagement with the interior of its welted margin, a depressor for forcing the forepart of a last into the forepart of the supported upper, and a series of lasting plates for laying the welted margin of the forepart of the upper over the margin of the last bottom.

12. In a machine for use in the manufacture of pre-welted shoes, means for supporting a pre-welted upper by engagement within the welt crease, a series of clamping plates movable heightwise of the supported upper, and means for positioning said plates to enter the interior of the supported upper, said positioning means becoming inoperative after said plates have entered the upper.

13. In a machine for use in the manufacture of pre-welted shoes, means for supporting a pre-welted upper by engagement within the welt crease, a series of resilient clamping plates for clamping the welted margin of the supported upper against said supporting means, means for moving said plates heightwise of the supported upper into the interior of the upper, and means for springing said plates inwardly into position to enter the supported upper and for holding the plates in said position until after they have entered the upper.

14. In a machine for use in the manufacture of pre-welted shoes, means for supporting a pre-welted upper by engagement within the welt crease, a series of resilient clamping plates for clamping the welted margin of the supported upper against said supporting means, means for moving said plates heightwise of the supported upper into the interior of the upper, means for springing said plates inwardly into position to enter the supported upper and for holding the plates in said position until after they have entered the upper, and means for holding said springing means inoperative while the clamping plates are withdrawn from the supported upper.

15. In a machine for use in the manufacture of pre-welted shoes, means for gripping a pre-welted upper during the depression of a last thereinto comprising members constructed and arranged for movement heightwise of the upper into the interior of the upper, then outwardly into engagement with the interior surface of the welted margin of the upper, and cooperating gripping means constructed and arranged for engagement with the outsole-attaching face of the welt.

16. In a machine for use in the manufacture of pre-welted shoes, means for gripping the welted margin of a pre-welted upper during the depression of a last thereinto comprising gripping means constructed and arranged to engage the interior of the welted margin of the upper, and cooperating gripping plates constructed and arranged to engage the outsole-attaching face of the welt.

17. In a machine for use in the manufacture of pre-welted shoes, means for gripping the welted margin of a pre-welted upper during the depression of a last thereinto comprising a series of plates constructed and arranged for movement heightwise of the upper into its interior and then outwardly into engagement with the inner surface of its welted margin, cooperating gripper plates constructed and arranged for movement in a plane generally common to the welted margin of the upper into engagement with the outsole-attaching face of the welt, and means for advancing said welt-engaging gripper plates after the plates which engage the interior of the upper have been brought into position.

18. In a machine for use in the manufacture of pre-welted shoes, means for supporting a prewelted upper by its welt, a spreader constructed and arranged to engage the interior of the supported upper, and a member constructed and arranged to contract the spreader to facilitate its entrance into the supported upper.

19. In a machine for use in the manufacture of pre-welted shoes, means for supporting a pre-welted upper by its welt, a spreader constructed and arranged to engage the interior of the supported upper, a member constructed and arranged to contract the spreader to facilitate its entrance into the supported upper, and yielding means connecting the spreader and the member and operating during the advancement of the spreader into the supported upper to hold said member in operative position.

20. In a machine for use in the manufacture of pre-welted shoes, means for supporting a pre-welted upper by its welt, a spreader for opening the forepart of the supported upper for the reception of a last, and means for contracting the spreader and holding it contracted during its advancement into the upper comprising a cam member constructed and arranged to move with the spreader during its advancement into the upper, suitable cam faces being provided on the spreader for engagement by said cam member.

21. In a machine for use in the manufacture of pre-welted shoes, means for supporting a pre-welted upper by its welt, a spreader for opening the supported upper for the reception of a last, means for contracting the spreader thereby to permit it to enter the supported upper, means for rendering said contracting means inoperative after the spreader has entered the supported upper, and means for holding said contracting means inoperative as the spreader is withdrawn from the supported upper.

22. In a machine for use in the manufacture of pre-welted shoes, means for supporting a pre-welted upper by its welt, a spreader for opening the supported upper for the reception of a last, a latch for holding the spreader in upper-engaging position, lasting members for laying the welted margin of the upper over upon the margin of the last bottom, and means operating during the advancement of the lasting members to release said latch.

23. In a machine for use in the manufacture of pre-welted shoes, a spreader for opening a supported pre-welted upper for the reception of a last, a member constructed and arranged to contract the spreader to permit the spreader to enter the supported upper, yielding means connecting the member and the spreader and positioning the member in operative relation to the spreader, means operating on the member to advance the member together with the spreader to position the spreader within the supported upper, and means for arresting the advancement of the spreader after it has entered the supported upper while permitting continued advancement of the member to remove it from its operative position in order to permit expansion of the spreader.

24. In a machine for use in the manufacture of pre-welted shoes, a spreader for opening a supported pre-welted upper for the reception of a last, a member constructed and arranged to contract the spreader to permit the spreader to enter the supported upper, yielding means connecting the member and the spreader and positioning the member in operative relation to the spreader, means operating on the member to advance the member together with the spreader to position the spreader within the supported upper, means for arresting the advancement of the spreader after it has entered the supported upper while permitting continued advancement of the member to remove it from its operative position in order to permit expansion of the spreader, and a spacer for positioning said member in advance of the spreader.

25. In a machine for use in the manufacture of pre-welted shoes, a spreader for opening a supported pre-welted upper for the reception of a last, a member constructed and arranged to contract the spreader to permit the spreader to enter the supported upper, yielding means connecting the member and the spreader and positioning the member in operative relation to the spreader, means operating on the member to advance the member together with the spreader to position the spreader within the supported upper, means for arresting the advancement of the spreader after it has entered the supported upper while permitting continued advancement of the member to remove it from its operative position in order to permit expansion of the spreader, a spacer for positioning said member in advance of the spreader with said spreader expanded, and means operating during the retraction of the spreader to render said spacer inoperative.

26. In a machine for use in the manufacture of pre-welted shoes, means for supporting a pre-welted upper for the reception of a last, means for forcing a last into the supported upper, lasting members constructed and arranged to engage the sole-attaching face of the welt and to bend the welted margin of the upper over the edge of the last bottom, means for actuating said lasting members, and a carrier for said actuating means constructed and arranged for movement heightwise of the upper.

27. In a machine for use in the manufacture of pre-welted shoes, means for supporting a pre-welted upper by its welt for the reception of a last, lasting wipers constructed and arranged to engage the sole-attaching face of the welt of the supported upper and to lay the welted margin of the upper over the margin of the bottom of a last positioned within the supported upper, wiper-actuating means constructed and arranged for movement heightwise of the supported upper, a carrier for said wiper-actuating means, and a last depressor mounted in the carrier and arranged to force the last into the supported upper before the wipers operate to lay the welted margin of the upper over upon the margin of the last bottom.

28. In a machine for use in the manufacture of prewelted shoes, means for supporting a pre-welted upper by its welt for the reception of a last, lasting wipers constructed and arranged to engage the sole-attaching face of the welt of the supported upper and to lay the welted margin of the upper over the margin of the bottom of a last positioned within the supported upper, wiper-actuating means constructed and arranged for movement heightwise of the supported upper, a carrier for said wiper-actuating means, a last depressor mounted in the carrier and arranged to force the last into the supported upper before the wipers operate to lay the welted margin of the upper over upon the margin of the last bottom, and means operating in advance of the last depressor for spreading the supported upper for the reception of the last, said spreading means serving also to guide the last during its depression into the upper.

29. In a machine for use in the manufacture of shoes, means for operating on the forepart of an upper while the rear part thereof is manually supported, and means for gaging the position of the rear part of the upper widthwise thereof relatively to said operating means.

30. In a machine for use in the manufacture of shoes, means for operating on the forepart of an upper while the rear part thereof is manually supported, a gage constructed and arranged to register with the back seam of the upper thereby to define the position of the rear part of the upper widthwise thereof relatively to said operating means, and a carrier for said gage constructed and arranged for movement lengthwise of the upper.

31. In a machine for use in the manufacture of pre-welted shoes, a depressor for pressing a last into a supported upper, a series of members constructed and arranged to bend the welted margin of the upper over the edge of the last bottom, and a moving head constructed and arranged to operate both the depressor and said members.

32. In a machine for use in the manufacture of pre-welted shoes, a depressor for pressing the forepart of a last into the forepart of a supported upper, a carrier for the depressor movable generally heightwise of the supported upper, members constructed and arranged to bend the welted margin of the forepart of the upper over the edge of the last bottom, and operating connections from the carrier to said members.

33. In a machine for use in the manufacture of pre-welted shoes, a depressor for pressing the forepart of a last into the forepart of a supported upper, members constructed and arranged to bend the welted margin of the forepart of the upper over the edge of the last bottom, a common actuating means for said depressor and said members whereby they are operated in a predetermined time relation to each other such that said members are first brought into engagement with the welted margin of the upper, then the forepart of the last is depressed into the forepart of the upper, and finally said members are further advanced to bend the welted margin of the upper over the edge of the last bottom.

34. In a machine for use in the manufacture of pre-welted shoes, a spreader constructed and arranged to engage the inner surface of the welted margin of the forepart of a supported upper, means for yieldingly holding the spreader in retracted position, means for moving the spreader into the supported upper, a latch for holding the spreader from return movement, members constructed and arranged to bend the forepart of the welted margin of the supported upper over the edge of the bottom of a last positioned in the upper, and means operating automatically during the advancement of said members to disengage the latch from the spreader thereby permitting the return of the spreader to its inoperative position before said members operate to bend the welted margin of the upper over the edge of the last bottom.

35. In a machine for use in the manufacture of pre-welted shoes, a depressor for forcing the forepart of a last into the forepart of a supported upper, a spreader constructed and arranged to engage the interior of the welted margin of the forepart of the upper and to guide the forepart of the last during its depression into the upper, means for yieldingly holding the spreader in its retracted position, means for advancing the spreader into upper-engaging position, a latch for holding the spreader in upper-engaging position, a series of members constructed and arranged to engage the welted margin of the forepart of the supported upper and to bend it over the edge of the forepart of the bottom of a last positioned within the upper, and a common actuator for the depressor and said upper-engaging members whereby said members are first advanced into upper-engaging position, then the depressor is operated while said members rest in their position of partial advancement, said actuating means operating during the latter part of the advancement of the depressor to disengage the latch from the spreader thereby permitting its return to its inoperative position and to bend the welted margin of the upper over the edge of the last bottom after the last has been depressed into the upper.

36. That improvement in methods of making pre-welted shoes which comprises securing to the overlasting margin of an upper which is in temper a leather welt which is not in temper, said welt being substantially shorter than the periphery of the bottom of a last corresponding in size to the upper, pulling the upper over such a last while the upper is in temper, and retaining the upper in pulled-over position on the last solely by the tension of the welt.

37. That improvement in methods of making pre-welted shoes which comprises securing to the overlasting margin of an upper which is in temper a welt which is not in temper, said welt being substantially shorter than the periphery of the bottom of a last corresponding in size to the upper, positioning the heel portion of such a last within the heel portion of the upper, relatively moving the last and the upper heightwise thereof in order to position the forepart of the last within the forepart of the upper, and retaining the forepart of the upper on the forepart of the last solely by the tension of the welt.

38. That improvement in methods of making pre-welted shoes which comprises stitching to the overlasting margin of an upper which is in temper a leather welt which is not in temper, progressively gathering the toe end of the overlasting margin during the progress of the stitching operation around the toe end of the upper thereby providing a pre-welted upper, the welt of which is substantially shorter than the periphery of the bottom of a last corresponding in size to the upper, relatively moving the upper and a last of corresponding size heightwise thereof thereby to position the last within the upper and retaining the upper on the last by the tension of the welt without the aid of last-penetrating fastenings.

39. That improvement in methods of making pre-welted shoes which comprises manually supporting the heel portion of a pre-welted upper, supporting the forepart of the upper on members extending generally heightwise of the supported upper and constructed and arranged to engage the upper-engaging face of the welt, positioning the heel portion of a last within the heel portion of the supported upper, and pressing the forepart of the last into the forepart of the upper.

40. That improvement in methods of making pre-welted shoes which comprises manually supporting the heel portion of a pre-welted upper, supporting the forepart of the upper on members constructed and arranged to engage the upper-engaging face of the welt, positioning the heel portion of a last within the heel portion of the supported upper, pressing the forepart of the last into the forepart of the upper, and retaining the upper on the last by the tension of the welt, said welt being substantially shorter than the periphery of the bottom of the last.

41. That improvement in methods of making pre-welted shoes which comprises manually supporting the heel portion of a pre-welted upper, supporting the forepart of the upper between members constructed and arranged to engage, respectively, the interior of the forepart of the upper in the region of the overlasting margin and the exterior of the forepart of the upper in the region of the welt crease, positioning the heel portion of a last within the heel portion of the upper, relatively moving the last and upper heightwise thereof thereby to position the forepart of the last within the forepart of the upper, and retaining the upper in position on the last by the tension of the welt, said welt being substantially shorter than the periphery of the bottom of the last.

42. That improvement in methods of making pre-welted shoes which comprises manually supporting the heel portion of a pre-welted upper, supporting the forepart of the upper by members constructed and arranged to engage, respectively, the interior of the forepart of the upper in the region of the overlasting margin, the exterior of the forepart of the upper in the region of the welt crease and the outsole-attaching face of the welt, positioning the heel portion of a last within the heel portion of the upper, pressing the forepart of the last into the forepart of the upper, and advancing said welt-engaging members to bend the welted margin of the upper over the edge of the last bottom.

KARL ENGEL.